Aug. 25, 1931.  H. D. ELSE  1,820,694
SHORT CIRCUITING DEVICE
Filed May 3, 1929
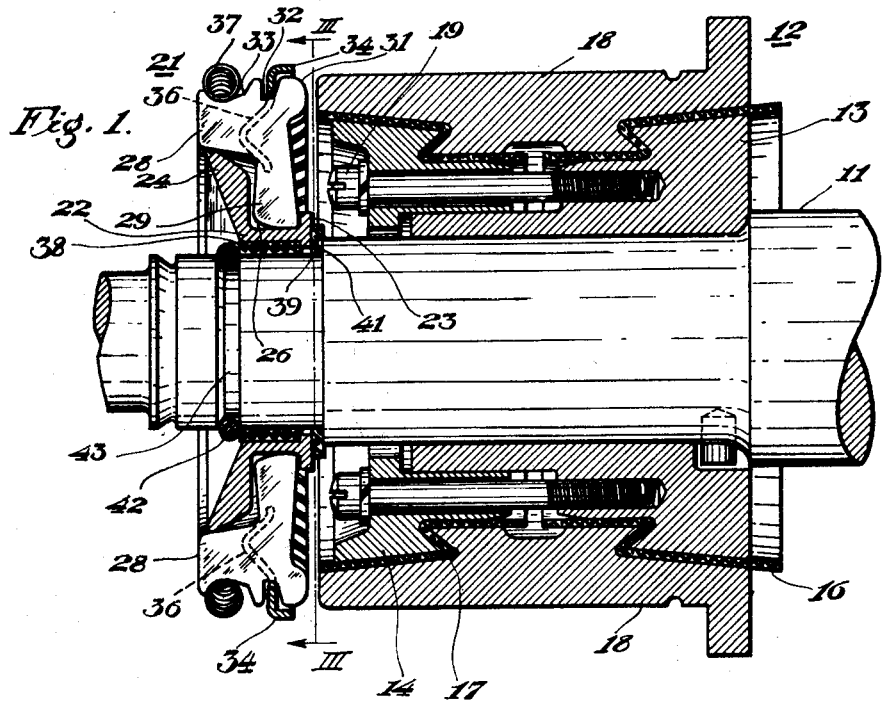
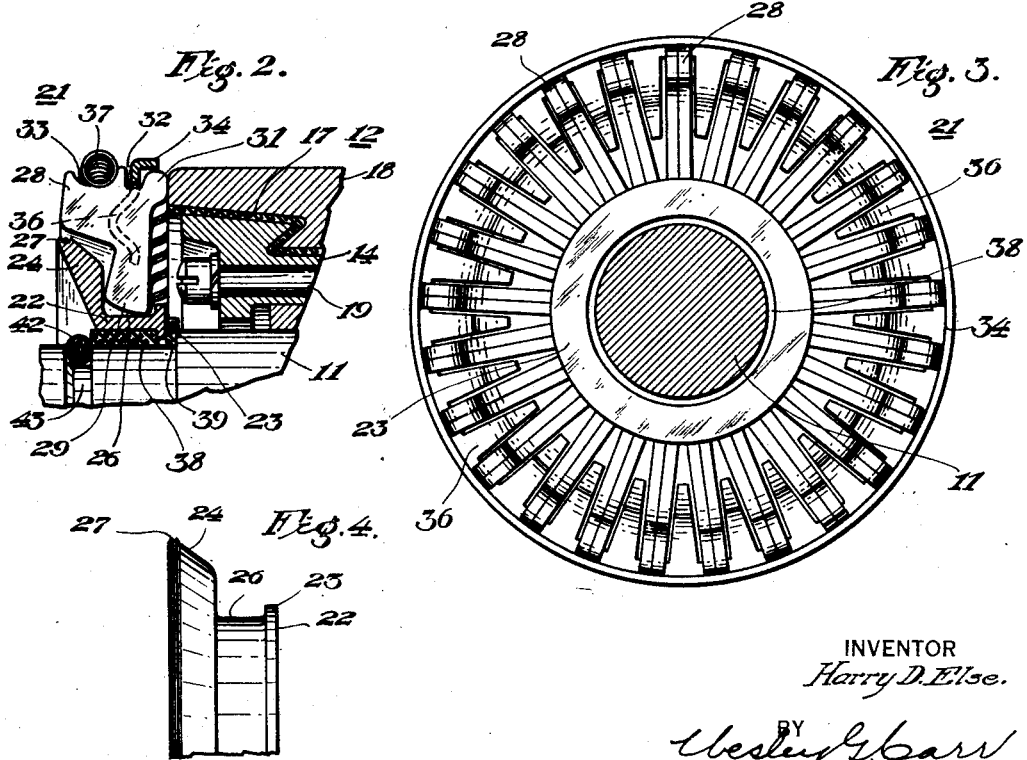
INVENTOR
Harry D. Else.
BY
ATTORNEY Patented Aug. 25, 1931

1,820,694

UNITED STATES PATENT OFFICE

HARRY D. ELSE, OF SPRINGFIELD, MASSACHUSETTS, ASSIGNOR TO WESTINGHOUSE ELECTRIC & MANUFACTURING COMPANY, A CORPORATION OF PENNSYLVANIA

SHORT-CIRCUITING DEVICE

Application filed May 3, 1929. Serial No. 360,108.

My invention relates to alternating-current motors and particularly to repulsion-induction motors.

An object of my invention is to provide a relatively simple, easily manufactured and installed centrifugally-actuable short-circuiting device for repulsion-induction motors.

Another object of my invention is to provide a short-circuiting device that shall require a minimum amount of space and that shall operate properly under all conditions of operation to which it may be subjected.

Another object of my invention is to provide a short-circuiting device, including a relatively large number of weight members normally restrained from operative engagement with the axial ends of a set of commutator bars by resilient means surrounding the weight members, the resilient member being so located that it is not included in the circuit of the short-circuited current, and the weight members being of such shape as to effect a fan action to keep down the temperature thereof.

Another object of my invention is to provide a short-circuiting device of this general kind that shall be movable into and out of operative engagement with commutator segments in a positive manner.

Other objects of my invention will, in part, be obvious or will be set forth hereinafter.

In practicing my invention, I provide a recessed hub for receiving the inner end portions of a plurality of weight members, each of approximately T-shape. One flange of the recessed hub is relatively small in external diameter, while the other flange thereof is of relatively larger external diameter and has its outer peripheral surface roughened. A floating guide ring is operatively associated with the weight members and is loosely supported thereby. The guide ring is provided with a plurality of radial inwardly-projecting return-bent fingers which interfit with the weight members. Each of the weight members is provided with an external recess, and a garter spring is located in the alined recesses.

In the single sheet of drawings,

Figure 1 is a view, in longitudinal section, through a device embodying my invention, shown in proper operative position relatively to a commutator cylinder and its shaft, Fig. 2 is a fragmentary view, in longitudinal section, of a device embodying my invention, shown in its actuated position, Fig. 3 is a view, in end elevation, of a device embodying my invention, and Fig. 4 is a fragmentary view, in side elevation, of a recessed hub.

The device embodying my invention is more particularly adapted to be applied to an alternating-current motor of the repulsion-induction type in which the rotor is provided with a wire winding usually located in a plurality of slots, the end of the rotor coils being connected to commutator segments.

In motors of this type, a plurality of brushes are provided, operatively engaging the peripheral face of the commutator segments and so located and connected that, upon closing the circuit of the energizing stator winding, a short-circuited current will flow through the rotor winding, commutator segments, brushes and their connectors, whereby a torque is produced to cause the rotor to start.

Upon reaching a predetermined speed, the short-circuiting device is effective to operatively engage the commutator segments to short circuit the same, after which the motor will operate as an induction motor.

In the drawings, I have illustrated a rotor shaft 11 having a commutator-cylinder assembly 12 mounted thereon. The commutator cylinder embodies a hub 13, a clamping ring 14, insulating bushings 16 and 17 and a plurality of segments or bars 18 of usual shape, the segments 18 being held in tightly clamped position on the commutator hub 13 by the clamping ring 14 and a plurality of longitudinally extending bolts 19. While I have illustrated a specific embodiment of commutator-cylinder construction, I do not desire to be limited thereto, as the details of such construction are not essential to my invention.

A short circuiting means 21 is operatively associated with the commutator-cylinder assembly 12 and is located on the shaft 11 adjacent to one end thereof. The short-circuiting means 21 comprises a hub 22 having two peripheral flanges 23 and 24 and a recess 26 between them. The flange 23 is of relatively small external diameter, while the flange 24 is of relatively large external diameter, the outer peripheral surface thereof being roughened, as by the formation of screw threads 27 thereon, for a purpose to be hereinafter set forth in detail. The flange 24 extends angularly outward, substantially as shown in the drawings.

A plurality of weight members 28, shown more particularly in Figs. 1 and 2 of the drawings and each of approximately T-shape, have the inner ends of their stem portions 29 located in the recess 26 of the hub 22. This inner face is slightly angularly inclined, in order that one portion of the respective weight members may move radially outwardly as the weight members tilt toward the axial face of the commutator segments.

Each of the weight members 28 is provided with a contact portion 31 at its outer end, the contact face of which is rounded, substantially as shown in the drawings. The outer-end face of each weight member is further provided with two spaced recesses 32 and 33, the latter being wider than the former and of substantially arcuate shape.

A floating guide ring 34 is loosely supported by the weight members 28 and is provided with a plurality of return-bent integral fingers 36 that extend radially inward between pairs of the weight members 28, as shown in Figs. 1 and 2 of the drawings, the edges of the fingers being parallel to the adjacent faces of the weight members, as is shown more particularly in Fig. 3 of the drawings.

A garter spring 37, which may be made in the form of a helically-wound spring wire, is adapted to be located in the alined recesses 33 of the weight members 28, and it may be noted that the recesses are slightly wider than the diameter of the spring in order that the spring may move therein.

The hub 22 is electrically insulated from the shaft 11 by means of a cylindrical bushing 38 of electric insulating material and a disc 39 also of electric insulating material. The disc 39 fits against a shoulder 41 on the shaft, and a spring ring 42 may be located in a peripheral groove 43 on the shaft, these members cooperating to hold the assembly 21 in a predetermined position on the shaft.

Referring more particularly to Fig. 1 of the drawings, the component parts of the short-circuiting device 21 are there shown in the positions which they occupy when the rotor is at rest, or when it is operating below a predetermined speed. In this case, the weight members are constrained by the spring 37 to take the positions shown, in which the left-hand "cross bar" portion of each of the weight members is yieldingly held against the outer peripheral surface of the flange 24 and more particularly against the roughened face 27 thereof. The roughened face 27 ensures that the rotor will not run away from the weight members. If the roughened surface were not provided, the weight members and the guide ring would have a tendency to skid on the edge of the hub as the rotor accelerates rapidly, and the device would not operate at the desired speed but would overrun that speed before the weight members, the guide ring and the spring could catch up with the hub.

The guide ring 34 fits loosely upon the weight members which are, therefore, free to move under the influence of centrifugal force. The fingers 36 which have a return-bent shape, as is shown in Figs. 1 and 2, will assist in preventing tilting or sidewise movement of the weight members when the motor is started or stopped.

As the speed or rotation increases, centrifugal force acts upon the weight members and, more particularly, upon the left-hand portions thereof, as shown in the drawings, to cause these parts to move outwardly against the restraining action of the spring. In so doing, the weight members will rock upon the inner inclined surfaces thereof which are in engagement with the outer peripheral surface of the recess 26. The spring 37 will be moved outwardly, coincident with the tilting of the weight members, until the faces of the portions 31 are moved into operative engagement with the adjacent end faces of the commutator segments. The recesses 33 are slightly wider than the diameter of the spring so that the latter may roll therein, as is shown in Figs. 1 and 2, this action resulting in a quick snap action of the weight members.

As the motor increases its speed to the normal operating speed, the weight members will engage the ends of the commutator segments with a greater pressure, thereby providing a relatively low contact resistance for the short-circuited current. It may also be noted that, if the weight members tend to move radially outwardly, such movement will be relatively small and will merely increase the radial pressure between the part 31 of each weight member and the ring 34 and I have found that this pressure is greater than that between a weight member and the commutator or segment. It may be noted that this provides a relatively short path for the short-circuited current and, as the guide ring is located between the contact portions of the weight members and the spring 37, little, if any, of the short-circuited current will tend to flow through the spring. This means that the spring will not lose its initial temper and strength, and I believe therefore, that this is an important feature of the device embodying my invention.

Upon reduction of the speed of rotation, the spring 37 is effective to ensure disengagement between the weight members and the commutator segments at a predetermined speed which may be slightly different than that at which engagement of these parts was effected, and I have found that disengagement is effected suddenly so that there is little or no tendency for the engaging surfaces to stick together.

The loosely mounted guide ring, supported in its proper operative position by the weight members, and interfitting therewith, ensures simultaneous movement of the weight members under the action of centrifugal force and prevents any appreciable radially outward movement of the weight members. The finger portions of the guide ring are so shaped as to prevent axial twisting of the weight members relatively to the hub or shaft. The hub is provided with means for increasing the frictional resistance between a flange of the hub and the weight members, thereby tending to maintain the weight members in their substantially radial positions.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A centrifugally-actuable short-circuiting device including a peripherally-recessed hub, a plurality of substantially-radial weight members having their inner ends located in the hub recess, and a rigid guide ring supported by said weight members.

2. A centrifugally-actuable short-circuiting device including a peripherally-recessed hub, a plurality of substantially radial weight members having their inner ends located in the hub recess, and a rigid guide ring having a portion thereof outside of the weight members and inter-fitting therewith to ensure simultaneous movement thereof under the action of centrifugal force.

3. A centrifugally-actuable short-circuiting device including a peripherally-recessed hub, a plurality of substantially-radial weight members having their inner ends located in the hub recess, and each having a recess in its outer edge portion, and a non-expansible guide ring for said weight members fitting into recesses therein.

4. A centrifugally-actuable short-circuiting device including a peripherally-recessed hub, a plurality of substantially-radial flat weight members having their inner ends located in the recess of said hub, and a floating guide ring supported by the weight members and having finger portions interfitting herewith, said finger portions being bent laterally to prevent twisting of the weight members axially of the hub.

5. A centrifugally-actuable short-circuiting device including a peripherally-recessed hub, a plurality of substantially-radial flat weight members having their inner ends located in the recess of said hub, and a floating guide ring supported by the weight members and having a lateral flange cooperating with an outer edge portion of the weight members to prevent direct radially outward movement thereof.

6. A centrifugally-actuable short-circuiting device including a peripherally-recessed hub, a plurality of substantially-radial flat weight members of approximately T-shape, having their inner ends tiltably located in the recess of said hub and having contact portions at one side of the outer portion, and a floating non-expansible ring supported by said weight members and interfitting therewith closely adjacent to the contact portions thereof to provide a relatively short path for the short-circuit current.

7. A centrifugally-actuable commutator-short-circuiting device including a plurality of substantially-radial weight members of approximately T-shape and having contact portions at one side of the outer portions thereof and a recess therein at the other side of the outer portions, a resilient restraining means for all of said weight members located in the recesses, and a floating rigid guide ring interfitting with said weight members and located near said contact portions to reduce flow of current into and through the resilient restraining means.

8. A centrifugally-actuable commutator-short-circuiting device including a hub of substantially U-shape in lateral section, a plurality of substantially radial weight members, each of approximately T-shape, having the end of its stem portion located in the annular recess of the hub, and a yielding annular member surrounding the weight members to initially press one end of the cross piece thereof against one flange of the hub, said flange embodying means for increasing the frictional resistance between the flange and the weight members.

9. A centrifugally-actuable commutator-short-circuiting device including a hub of substantially U-shape in lateral section, a plurality of substantially radial weight members, each of approximately T-shape, having the end of its stem portion located in the annular recess of the hub and having an outer portion initially engaging a flange portion of said hub at its outer periphery, said outer flange periphery being roughened to cooperate with the engaging portion of the weight members to ensure their peripheral movement upon rotation of the hub.

10. A centrifugally-actuable commutator-short-circuiting device including a hub of substantially U-shape in lateral section, a plurality of substantially radial weight members, each of approximately T-shape, having the end of its stem portion located in the annular recess of the hub, and a floating guide ring supported on the outside of the weight members and having finger portions extending radially inward between adjacent weight members to maintain them in their substantially radial positions.

11. A centrifugal-actuable commutator-short-circuiting device including a hub of substantially U-shape in lateral section, a plurality of substantially radial weight members, each of approximately T-shape having the end of the stem portion located in the annular recess of the hub, and a floating guide ring supported on the outside of the weight members and having return-bent finger portions extending radially inward between adjacent weight members to maintain them in their substantially radial positions and to preclude axial twisting thereof.

12. A centrifugally-actuable short-circuiting device adapted to be mounted on a shaft closely adjacent to, and in front of, a commutator, including a recessed hub, a plurality of weight members extending radially outward from said hub and each having an outer side portion adapted to operatively engage the end of a commutator segment, a floating guide ring supported by the weight members, on the outside thereof adjacent to said side portion to constitute therewith a relatively short current path from the commutator bars, and an annular spring on the outside of the weight members tending to bias said members away from the commutator.

13. A centrifugally-actuable short-circuiting device adapted to be mounted on a shaft closely adjacent to, and in front of, a commutator, including a recessed hub, a plurality of weight members extending radially outward from said hub and each having an outer side portion adapted to operatively engage, or be disengaged from, the ends of the commutator segments, and a floating guide ring located on the outside of, and supported by, the weight members to preclude radially outward movement thereof and to force them to tilt axially away from and toward the commutator in accordance with speed conditions.

14. A centrifugally-actuable short-circuiting device adapted to be mounted on a shaft closely adjacent to, and in front of, a commutator, including a recessed hub, a plurality of weight members extending radially outward from said hub and each having an outer side portion adapted to operatively engage the end of a commutator segment, a floating guide ring supported by the weight members, on the outside thereof adjacent to said side portion to constitute therewith a relatively short current path from the commutator bars, an annular spring on the outside of the weight members tending to bias said members away from the commutator, and an insulating bushing between the hub and the shaft to prevent grounding of the commutator when operatively engaged by the weight members.

15. A centrifugally-actuable short-circuiting device including a peripherally-recessed hub, a plurality of weight members each of approximately T-shape and having the ends of the stem portion located in the hub recess, and a floating non-expansible radially-slotted guide ring having one portion located outside of the weight members at one edge thereof and having the radially-slotted portion interfitting with the weight members to ensure substantially simultaneous movement of the weight members under the action of centrifugal force.

In testimony whereof, I have hereunto subscribed my name this 26th day of April 1929.

HARRY D. ELSE.